United States Patent [19]

Yokocho et al.

[11] Patent Number: 5,383,330
[45] Date of Patent: Jan. 24, 1995

[54] HAND-HELD EDGER

[75] Inventors: Yoetsu Yokocho, Ohme; Michiyasu Kuwano, Fuchu; Fumihiko Aiyama, Musashimurayama, all of Japan

[73] Assignee: Kioritz Corporation, Tokyo, Japan

[21] Appl. No.: 176,666

[22] Filed: Jan. 3, 1994

[30] Foreign Application Priority Data

Jan. 21, 1993 [JP] Japan ............... 5-001225[U]

[51] Int. Cl.⁶ ............... A01D 34/47; A01D 34/84; A01G 3/06
[52] U.S. Cl. ............... 56/256; 56/16.7; 172/15; 172/17
[58] Field of Search ............... 56/16.9, 17.5, 17.2, 56/16.7, 12.7, 256, 320.1; 172/15, 17; 30/276

[56] References Cited

U.S. PATENT DOCUMENTS

| | | | |
|---|---|---|---|
| 2,708,335 | 5/1955 | Newton | 56/12.7 |
| 2,827,748 | 3/1958 | Simpson | 56/16.9 |
| 3,006,421 | 10/1961 | Feilbach | 172/15 |
| 3,358,431 | 12/1967 | Fitzgerald, Jr. | 56/17.5 |
| 3,561,199 | 2/1971 | Lay | 56/17.1 |
| 3,807,151 | 4/1974 | Rosenthal et al. | 56/16.9 |
| 3,877,146 | 4/1975 | Pittinger | 56/17.5 X |
| 4,268,964 | 5/1981 | Moore | 30/276 |
| 4,364,435 | 12/1982 | Tuggle et al. | 172/15 |
| 4,679,385 | 7/1987 | Carmine | 56/16.9 |
| 4,712,363 | 12/1987 | Claborn | 56/16.7 |
| 4,756,148 | 7/1988 | Gander et al. | 56/17.2 |
| 4,803,831 | 2/1989 | Carmine | 56/16.9 |
| 4,894,914 | 1/1990 | Mead | 30/276 |
| 4,914,899 | 4/1990 | Carmine | 56/16.7 |
| 4,981,012 | 1/1991 | Claborn | 56/16.9 |
| 5,029,435 | 7/1991 | Buchanan | 56/12.1 |
| 5,060,383 | 10/1991 | Ratkiewich | 30/276 |
| 5,263,303 | 11/1993 | Stroud | 56/17.4 X |

Primary Examiner—Stephen J. Novosad
Attorney, Agent, or Firm—Cushman Darby & Cushman

[57] ABSTRACT

A hand-held edger is disclosed which is so constructed that the lower portions of the gear box and the safety cover member are prevented from directly scraping against the ground during trimming operation to enable abrasion thereof to be avoided, and that tendency to be caught by lawn grasses and liability to wobble are extremely reduced to enable improved operational properties to be attained. The hand-held edger comprises a supporting rod 14 one end of which is connected to a prime mover, a gear box 20 connected to the other end of said supporting rod 14, a rotary blade 22 which is driven by power transmitted from said prime mover via said gear box 20, a safety cover member 12 which covers said rotary blade 22, and a traveling wheel 17 journal-supported by a rear portion 12b behind said gear box 20, wherein a ring-shaped traveling auxiliary wheel 30 is rotatably mounted over the circumference of said gear box 20.

2 Claims, 5 Drawing Sheets

HAND-HELD EDGER

BACKGROUND OF THE INVENTION

1. Field of the Invention

The present invention relates to a hand-held edger suitable for operation of trimming lawn grasses or the like, for example, at a border of a lawn or a boundary between different levels in a lawn or an edge of a bunker in a golf course.

2. Description of the Prior Art

An example of a conventional hand-held edger of this type is shown in FIG. 5. FIG. 5 shows the main portion (portion on or near the ground) of a hand-held edger 10. This hand-held edger 10 comprises a tubular supporting rod 14 connected at its one end, for example, to an air-cooled two-cycle gasoline engine or motor as a prime mover (not shown), and a gear box 20 having a shape of a stepped cylinder connected to the other end (lower end) of the tubular supporting rod 14.

To an output shaft of the gear box 20, which horizontally extends toward the rear side of the drawing, a rotary blade 22 is attached which is driven by power transmitted from the engine through a drive shaft 16 disposed in the supporting rod 14 and the gear box 20. A safety cover member 12 having side surfaces of substantially sector shape is fixed to the gear box 20 between the supporting rod 14 and the rotary blade 22 by means of bolts 24 or the like.

A traveling wheel 17 is rotatably supported by a rear portion 12b formed behind the gear box 20 and protruding from a circumferential wall 12a of the safety cover member 12 which circumferentially surrounds the rotational locus of the rotary blade 22.

When a trimming operation is conducted using the hand-held edger 10 having such a structure, grasses which have grown beyond a border of a lawn or the like are usually trimmed in such a manner that the rotary blade 22 is rotated with the safety cover member 12 and the gear box 20 kept apart from the ground G (margin of a lawn or the like) at a proper height by lifting the supporting rod 14 while using the traveling wheel 17 as a fulcrum.

In such a conventional hand-held edger 10 as above, however, there is a problem that the lower surfaces 20a and 12c of the gear box 20 and the safety cover member 12 are scraped against the ground during trimming, and consequently abrasion thereof is caused.

Besides the above problem, there are problems concerning operational properties in that the lower portions of the gear box 20 and the cover member 12 tend to be caught by a lawn grass or the like during deep mowing, that the entire body is likely to wobble when the edger is used while keeping the traveling wheel 17 lifted (for example, when trimming operation is conducted at a narrow place or a configurationally complicated place), and that traveling stability (in particular, straight advance properties) is not satisfactory even in a flat place.

SUMMARY OF THE INVENTION

In view of these points, it is an object of the present invention to provide a hand-held edger which is so constructed that the lower portions of the gear box and the safety cover member are prevented from directly scraping against the ground during trimming operation to enable abrasion thereof to be avoided, and that tendency to be caught by lawn grasses and liability to wobble are extremely reduced to enable improved operational properties to be attained.

To attain the above-mentioned object, one form of the hand-held edger according to the present invention comprises, as general components, a supporting rod one end of which is connected to a prime mover, a gear box connected to the other end of the supporting rod, a rotary blade which is driven by power transmitted from the prime mover via the gear box, a safety cover member which covers the rotary blade, and a traveling wheel journal-supported by a rear portion behind the gear box.

This form is characterized in that a ring-shaped traveling auxiliary wheel is rotatably mounted over the circumference of the gear box.

Another form of the hand-held edger according to the present invention is characterized in that, in addition to the above general components, a ground contact guide member made of a material excellent in abrasion resistance and having a curved ground contact surface is disposed below the lower surface of said gear box.

In the hand-held edger according to the present invention which is constructed as described above, since a traveling auxiliary wheel or a ground contact guide member is provided, the lower portions of the gear box and the safety cover member are prevented from directly scraping against the ground during trimming operation, thereby enabling abrasion thereof to be effectively avoided.

Further, since the traveling auxiliary wheel is rotatable and the ground contact guide member has its ground contact surfaces curved, tendency of the mowing blade to be caught by lawn grasses or the like is lowered even in deep mowing. Moreover, since the traveling auxiliary wheel or the ground contact guide member can be in contact with the ground even in a case where the edger is used while maintaining the traveling wheel lifted, liability of the entire body to wobble is reduced. Furthermore, by bringing the traveling auxiliary wheel or the ground contact guide member into contact with the ground, the entire body is two point-supported by the traveling auxiliary wheel or the ground contact member together with the traveling wheel, and yet the traveling auxiliary wheel or the ground contact guide serves as a guide which pushes lawn grasses or the like aside, thereby enabling improved traveling stability, in particular, improved straight advance properties to be attained.

DESCRIPTION OF THE PREFERRED EMBODIMENTS

Now, embodiments of the present invention will be described with reference to the accompanying drawings.

Figure 5:
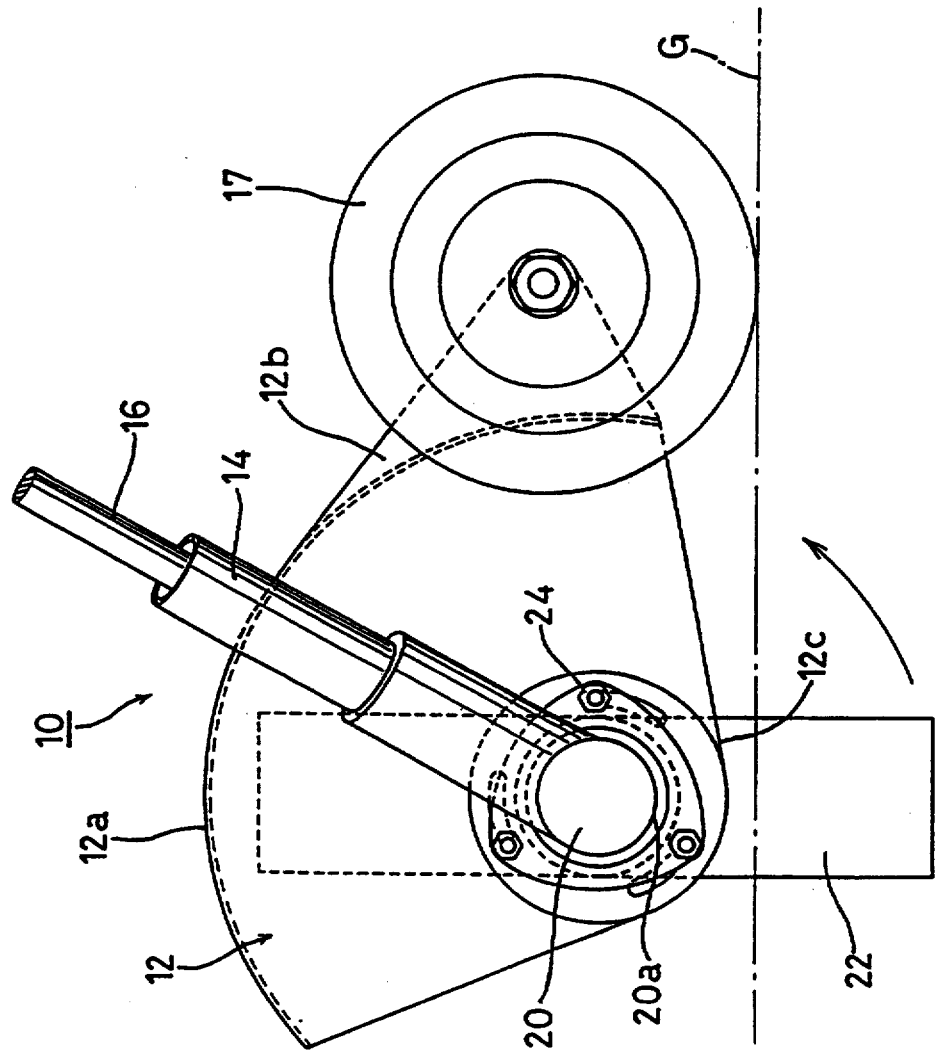
FIG. 5 is a side view showing the main portion of a conventional hand-held edger.

Since hand-held edgers of the following embodiments are constructed similarly to the above-mentioned conventional one shown in FIG. 5 as to their basic structures, the same reference numbers are allotted to the parts as allotted to the corresponding parts of the conventional hand-held edger shown in FIG. 5 to eliminate overlapping explanation, and specific portions will be described principally hereinbelow.

Figure 1:
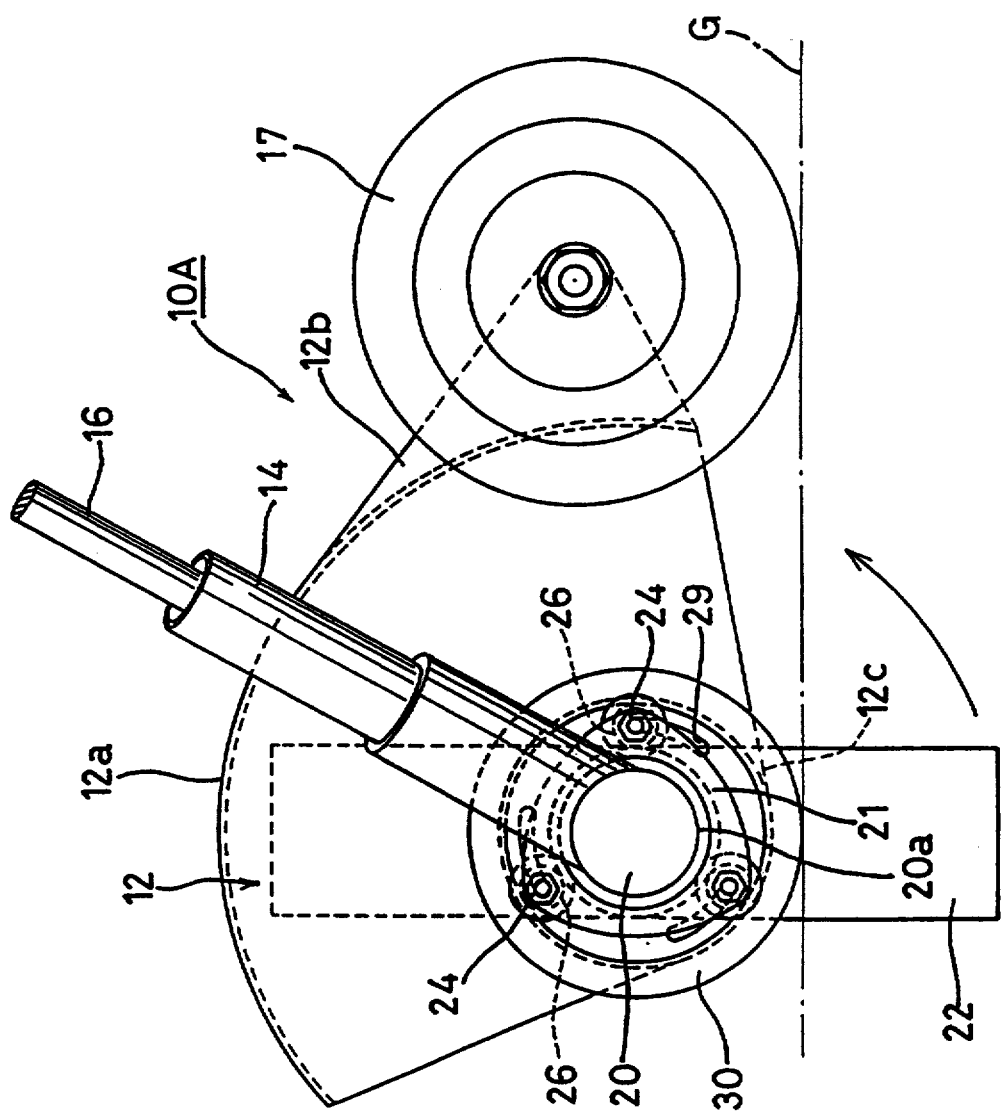
FIG. 1 is a side view showing the main portion of the first embodiment of the hand-held edger according to the present invention.
Figure 2:
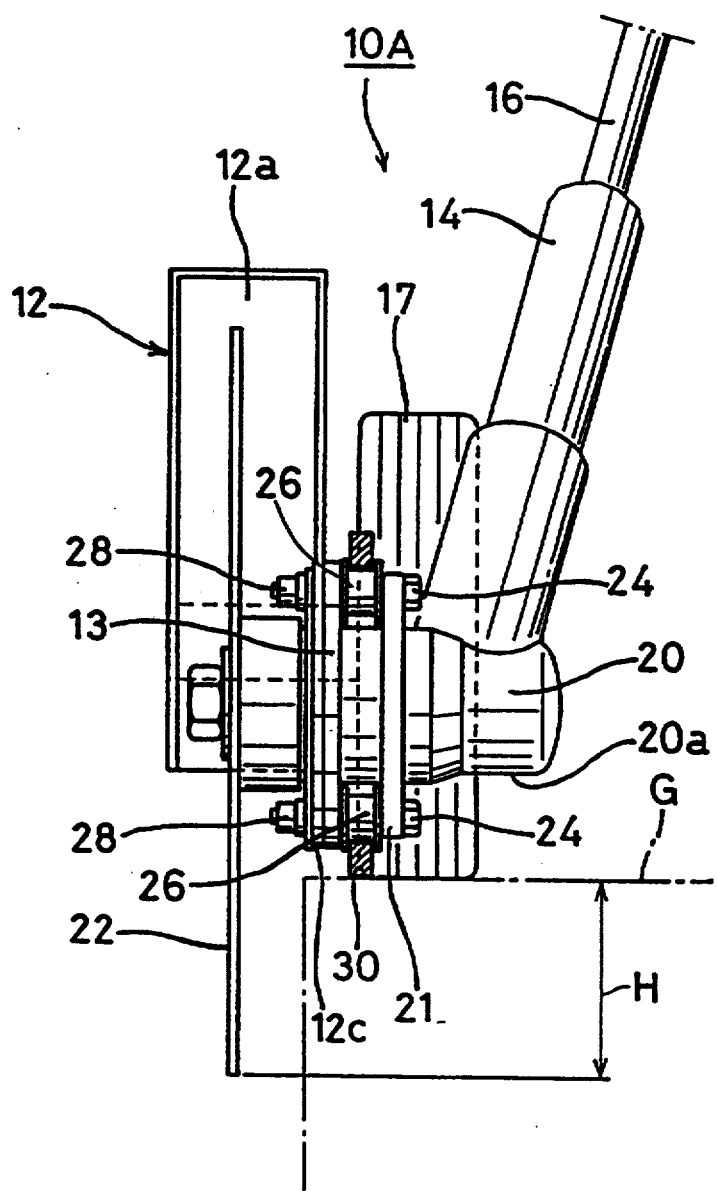
FIG. 2 is a front view of the first embodiment shown in FIG. 1.

FIGS. 1 and 2 illustrate the first embodiment of the hand-held edgers according to the present invention. The hand-held edger 10A of this embodiment is characterized in that a ring-shaped traveling auxiliary wheel 30 is rotatably mounted over the circumference of a gear box 20. In other words, a substantially triangular flange 21 is mounted on one side of the gear box 20, and a boss 13 is mounted on a safety cover member 12 oppositely to the flange 21, and the flange 21 and the boss 13 are connected each other by means of three pairs of bolt 24 and nut 28 with a collar 26 interposed therebetween, and a ring-shaped traveling auxiliary wheel 30 made of a synthetic resin and having excellent abrasion resistance is rotatably fitted on the circumference of the collars 26. The circumference of this traveling auxiliary wheel 30 is designed to protrude downwardly beyond the flange 21 defining the lowermost surface of the gear box 20 and the boss 13 defining the lowermost surface 12c of the safety cover member 12.

Reference number 29 in Figs. represents elongate apertures which are formed in the boss 13 of the safety cover member 12 to enable adjustment of the connectional angle between the safety cover member 12 and the gear box 20 in the vertical plane and through which the bolts 24 are inserted. By changing the connectional angle, cutting depth H of a rotary blade 22 can be adjusted.

Figure 3:
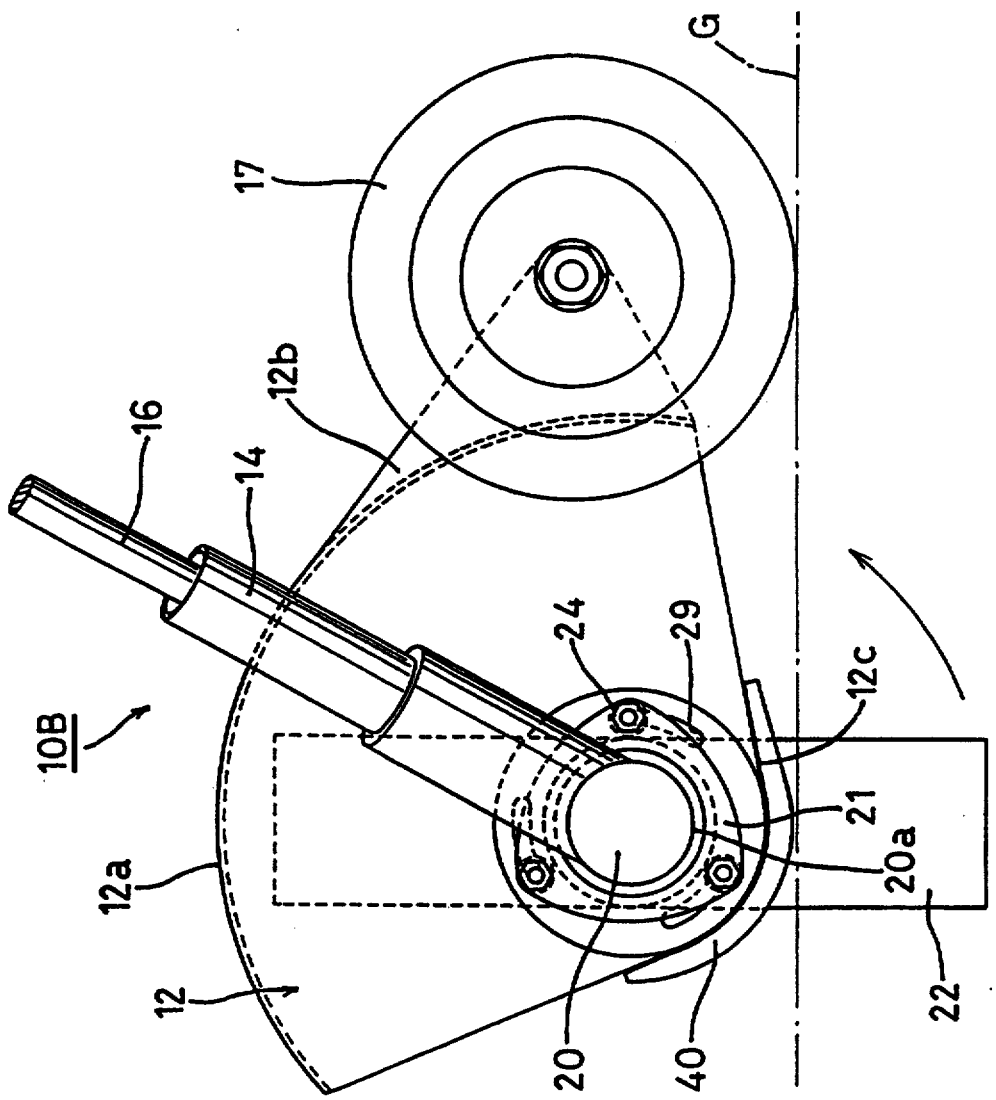
FIG. 3 is a side view showing the main portion of the second embodiment of the hand-held edger according to the present invention.

FIG. 3 shows the second embodiment of the hand-held edgers according to the present invention. In this hand-held edger 10B, a ground contact guide member 40 made of a synthetic resin excellent in abrasion resistance and having a curved ground contact surface is fixedly attached to the arc-like portion defining the lowermost surface 12c of the safety cover member 12 with an adhesive or the like.

Figure 4:
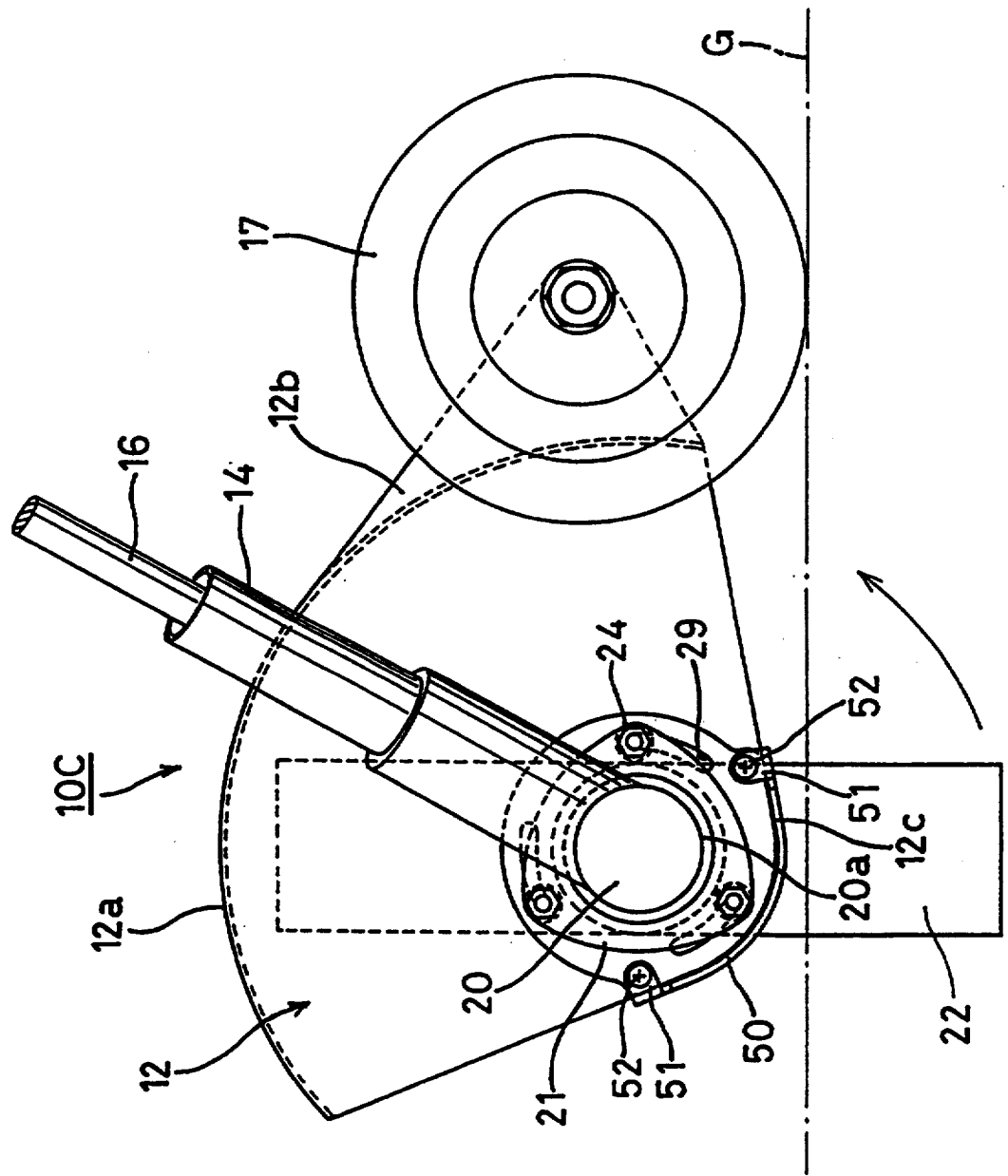
FIG. 4 is a side view showing the main portion of the third embodiment of the hand-held edger according to the present invention.

FIG. 4 shows the third embodiment of the hand-held edgers according to the present invention. In this hand-held edger 10C, a ground contact guide member 50 made of a hardened steel plate excellent in abrasion resistance is mounted on the arc-like portion defining the lowermost surface 12c of the safety cover member 12 instead of the above-mentioned ground contact guide member 40 made of a synthetic resin. The ground contact guide 50 is configured so as to curve along the arc-like portion of the safety cover member 12, and mounted on the safty cover member 12 with the safety cover member 12 and boss 13 clamped by mounting plate portions 51, 51 formed at the ends thereof and having a staple-shaped cross-section, and fastened by means of screws 52.

Since each of the hand-held edgers of the embodiments constructed as above is provided with a traveling auxiliary wheel 30 or a ground contact guide member 40 or 50, the respective lowermost portions 20a and 12c of the gear box 20 and the safety cover member 12 are prevented from directly scraping against the ground or the like during trimming operation, thereby enabling abrasion thereof to be effectively avoided.

Further, since the traveling auxiliary wheel 30 is rotatable and the ground contact guide members 40 and 50 have their ground contact surfaces curved, tendency of the mowing blade of the edger 10 to be caught by lawn grasses or the like is lowered even in deep mowing. Moreover, since the traveling auxiliary wheel 30 and the ground contact guide members 40 and 50 can be in contact with the ground even in a case where the edger is used while maintaining the traveling wheel 17 lifted, liability of the entire body to wobble is reduced. Furthermore, by bringing the traveling auxiliary wheel 30 or the ground contact guide member 40 or 50 into contact with the ground, the entire body is two point-supported by the auxiliary wheel 30 or the guide member 40 or 50 together with the traveling wheel 17, and yet the traveling auxiliary wheel 30 or the ground contact guide 40 or 50 serves as a guide which pushes lawn grasses or the like aside, thereby enabling improved traveling stability, in particular, improved straight advance properties to be attained.

As is understood from the above description, according to the hand-held edger of the present invention, there are obtained excellent effects that the lower portions of the gear box and the safety cover member are effectively prevented from directly scraping against the ground during trimming operation to enable abrasion thereof to be avoided, and that tendency to be caught by lawn grasses and liability to wobble are extremely reduced and traveling stability is increased, thereby enabling improved operational properties to be attained as compared with conventional ones.

What is claimed is:

1. A hand-held edger comprising:
   a supporting rod 14 one end of which is connected to a prime mover, a gear box 20 connected to the other end of said supporting rod 14, a rotary blade 22 which is driven by power transmitted from said prime mover via said gear box 20, a safety cover member 12 which covers said rotary blade 22, and a traveling wheel 17 journal-supported by a rear portion 12b behind said gear box 20;
   wherein a ring-shaped traveling auxiliary wheel 30 is rotatably mounted over the circumference of said gear box 20.

2. A hand-held edger comprising:
   a supporting rod 14 one end of which is connected to a prime mover, a gear box 20 connected to the other end of said supporting rod 14, a rotary blade 22 which is driven by power transmitted from said prime mover via said gear box 20, a safety cover member 12 which covers said rotary blade 22, and a traveling wheel 17 journal-supported by a rear portion 12b behind said gear box 20;
   wherein a ground contact guide member 40 or 50 made of a material excellent in abrasion resistance and having a curved ground contact surface is disposed below the lower surface 20a of said gear box 20.

* * * * *